US012718026B1

(12) United States Patent
Hutton

(10) Patent No.: US 12,718,026 B1
(45) Date of Patent: Aug. 25, 2026

(54) SEMANTIC DATA PROCESSING SYSTEM AND COMPUTER-IMPLEMENTED METHOD FOR PROCESSING A RECEIVED UNSTRUCTURED DATA FILE

(71) Applicant: QUANTEXA LTD., London (GB)

(72) Inventor: Jamie Hutton, London (GB)

(73) Assignee: QUANTEXA LTD., London (GB)

( * ) Notice: Subject to any disclaimer, the term of this patent is extended or adjusted under 35 U.S.C. 154(b) by 0 days.

(21) Appl. No.: 19/343,640

(22) Filed: Sep. 29, 2025

(51) Int. Cl.
*G06F 40/30* (2020.01)
*G06N 5/022* (2023.01)
*G06N 5/04* (2023.01)

(52) U.S. Cl.
CPC ............ *G06F 40/30* (2020.01); *G06N 5/022* (2013.01); *G06N 5/04* (2013.01)

(58) Field of Classification Search
None
See application file for complete search history.

(56) References Cited

U.S. PATENT DOCUMENTS

2020/0097601 A1* 3/2020 Han ........................ G06F 16/36
2021/0109995 A1* 4/2021 Mihindukulasooriya .................... G06F 40/247
2021/0125294 A1* 4/2021 Tidwell .............. G06Q 30/0205
2021/0342541 A1* 11/2021 Taylor ................... G06F 40/295
2024/0386015 A1* 11/2024 Crabtree ............ G06F 16/9024

* cited by examiner

*Primary Examiner* — Daniel C Washburn
*Assistant Examiner* — Tyler Becker
(74) *Attorney, Agent, or Firm* — Ziegler IP Law Group, LLC.

(57) ABSTRACT

A semantic data processing system for processing an unstructured data file based on semantics of textual content of the unstructured data file comprises a processing arrangement configured to: receive, structured reference data, via reference data ingester; receive unstructured data files via an unstructured data file preprocessor: generate, via knowledge graph generator, knowledge graph from the structured reference data using structure of the structured reference data, the knowledge graph specifying a plurality of different entities having relationships with each other and relationship data linking the different entities; generate, via entity-centric search query generator, entity-centric search query by using the knowledge graph, the entity-centric search query specifying plurality of entity-related textual terms and parameters regarding the relationships between the entity-related textual terms; and execute, via contextual matching engine, the entity-centric search query on the received unstructured data file to generate a match score relating to the relevance of textual content of the unstructured data file to the entity-centric search query.

24 Claims, 8 Drawing Sheets

SEMANTIC DATA PROCESSING SYSTEM AND COMPUTER-IMPLEMENTED METHOD FOR PROCESSING A RECEIVED UNSTRUCTURED DATA FILE

TECHNICAL FIELD

The present disclosure relates to semantic data processing systems for processing received unstructured data files. Moreover, the present disclosure relates to computer-implemented methods for processing received unstructured data files. Furthermore, the present disclosure relates to non-transitory machine-readable storage mediums.

BACKGROUND

Data processing systems typically require data to be in a structured form for matching data. Structured data such as database records containing names, dates, and identifiers is relatively easy to analyze and search using conventional query-based or rule-based techniques. However, data processing systems often need to match unstructured data (such as news, emails, text documents) with structured data for informed decision making. For example, if an organization is trying to understand their customer, it can be useful to understand if that individual is mentioned in any unstructured data (such as news, emails, text documents etc). Typically, to match the unstructured data with the structured data, the existing data processing systems process the unstructured data into structured data, prior to performing the match. These systems use techniques such as natural language processing (NLP), entity extraction, and relationship extraction to extract the unstructured data into structured information, which is then matched with the structured data.

Despite the various advancements, existing data processing systems (or simply referred to as "existing systems") continue to face significant technical challenges. The existing systems rely heavily on entity extraction from the unstructured free text, which is inaccurate and the information extracted about the entity is sparse. For example, an individual mentioned in a news article will rarely be listed alongside their full address, date of birth or phone number. Moreover, the existing systems fail to identify implicit relationships between the entities, and thus, the unstructured data is imperfectly extracted into the structured data. For example, a news article may mention multiple different entities, and this can be used to help increase the matching. However, relationship extraction is an even more complex task to get right and Existing systems will typically miss "implicit" relationships, only extracting those that are explicitly mentioned in the text. Furthermore, when the unstructured data is successfully extracted into the structured data, the information extracted by the existing systems is too sparse for direct matching. For example, in a news article, we may only have an individual's name and some very high-level other information (e.g. city or age). This alone is not enough to perform a confident match to other structured data sources (it is very common to have two people with the same name living in the same city or who are the same age). So therefore, when the match between the structured and unstructured data is performed, either the matching has to be very loose (resulting in lots of matches which may be false) or tighter, resulting in lots of missed matches.

Therefore, in light of the foregoing discussion, there exists a need to overcome the aforementioned drawbacks.

SUMMARY

The aim of the present disclosure is to provide a semantic data processing system, a computer-implemented method and a non-transitory machine-readable storage medium to remove the need to do entity extraction from the unstructured data and avoid the traditional limitation of having a sparsity of data for the match itself. The aim of the present disclosure is achieved by a semantic data processing system, a computer implemented method and non-transitory machine-readable storage medium for processing a received unstructured data file based on semantics of textual content of the unstructured data file as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

Embodiments of the present disclosure will now be described, by way of example only, with reference to the following diagrams wherein.

DETAILED DESCRIPTION OF EMBODIMENTS

Figure 1:
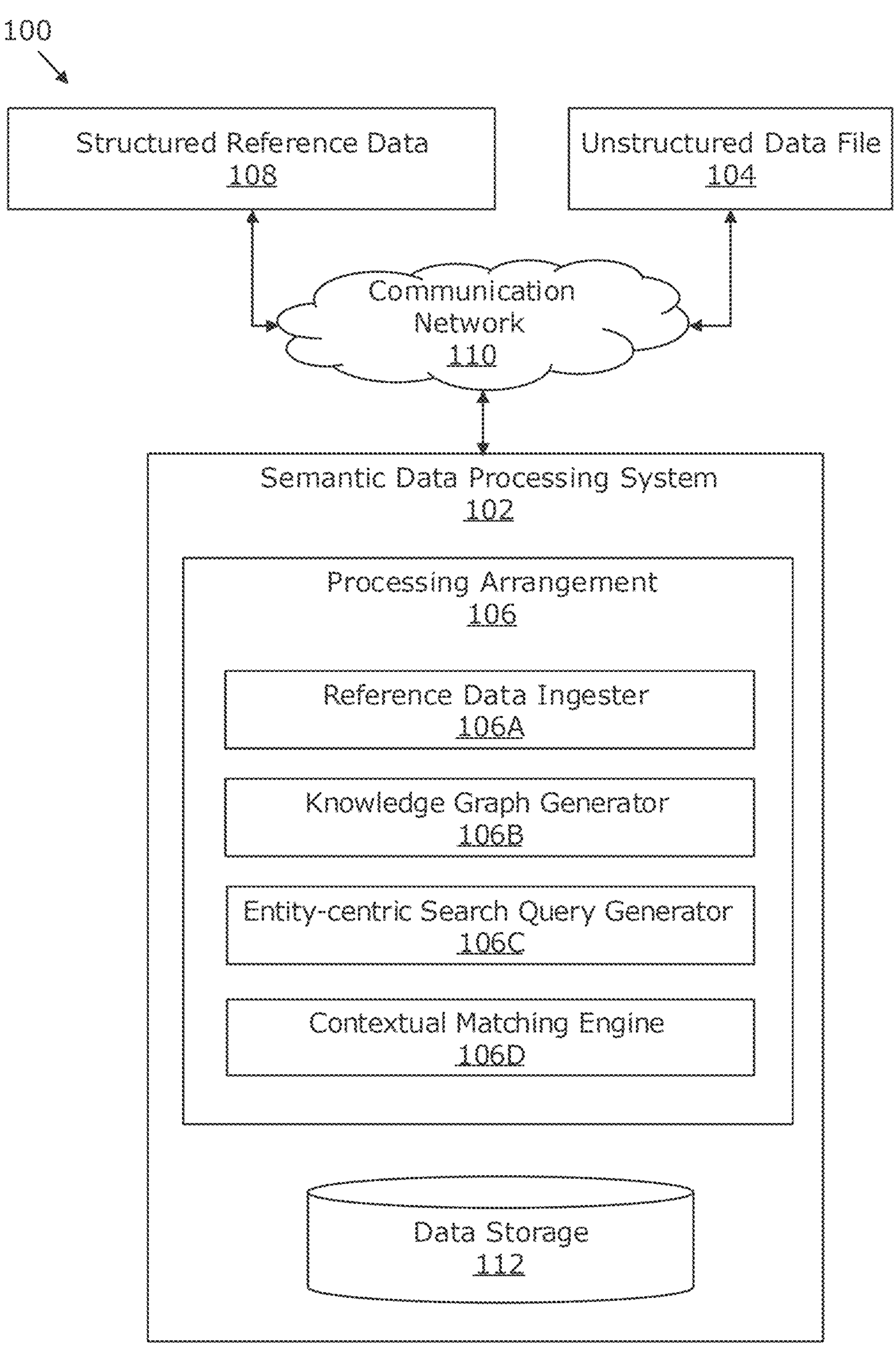
FIG. 1 is an illustration of block diagram showing an environment where a semantic data processing system is implemented, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a semantic data processing system for processing an unstructured data file based on semantics of textual content of the unstructured data file, the system comprising a processing arrangement configured to:

- receive, structured reference data, via a reference data ingester;
- receive unstructured data files via an unstructured data file preprocessor;
- generate, via a knowledge graph generator, a knowledge graph from the structured reference data using the structure of the structured reference data, the knowledge graph specifying a plurality of different entities having relationships with each other and relationship data linking the different entities;
- generate, via an entity-centric search query generator, an entity-centric search query by using the knowledge graph, the entity-centric search query specifying a plurality of entity-related textual terms and parameters regarding the relationships between the entity-related textual terms; and
- execute, via a contextual matching engine, the entity-centric search query on the received unstructured data file to generate a match score relating to the relevance of textual content of the unstructured data file to the entity-centric search query.

The present disclosure provides the aforementioned semantic data processing system that enables contextual matching of the unstructured data file based on the semantics derived from structured reference data, thereby significantly improving the accuracy, precision, and relevance of identification of the entities within the unstructured data file. The semantic data processing system achieves this by ingesting the structured reference data and generating the comprehensive knowledge graph that encodes entities and interrelationships between the entities, facilitating a machine-readable representation of real-world associations between the entities. By leveraging the knowledge graph, the system constructs entity-centric search queries that incorporate not only key entity identifiers but also semantic relationship parameters, thereby enabling more contextually rich and targeted searches across the unstructured data file. Moreover, the semantic data processing system enhances data matching accuracy by executing the entity-centric search queries on the received unstructured data file using the contextual matching engine. The contextual matching engine evaluates the semantic similarity between the structured entity data (represented as a knowledge graph) and unstructured text content, producing the match score that quantifies relevance. The interaction between the knowledge graph generator, the entity-centric search query generator, and the contextual matching engine ensures a high-confidence mapping between heterogeneous data types without the need for extensive preprocessing of the unstructured data file. The synergistic architecture of the system allows for robust semantic analysis, reduces false positives common in name-only searches, supports dynamic processing decisions, and unlocks latent insights from sparse or noisy textual data sources. Furthermore, by automating the construction of semantically meaningful queries from the structured data, the sematic data processing system (referred as the system, hereinafter) enhances scalability and adaptability across use cases such as compliance monitoring, security analysis, and intelligence gathering. Furthermore, the semantic data processing system is computationally less intensive.

Throughout the present disclosure, the term "unstructured data file" refers to a data record or digital document that lacks a predefined data arrangement or organizational schema. The unstructured data file may include text-based sources such as news articles, social media posts, open-source intelligence (OSINT) reports, emails, surveillance transcripts, customer service logs, or any other narrative content in natural language. Thus, operating the unstructured data file is difficult for conventional systems.

In this regard, the term "semantics" refers to the contextual meaning and intent derived from natural language expressions within the unstructured data file. Semantic analysis entails identifying keywords or entities, understanding the relationships between entities such as who did what, to whom, when, and in what context. The semantic analysis allows the system to perform entity-based contextual reasoning, which is critical in accurately determining whether a particular unstructured data file is relevant to a known entity or scenario described in structured reference data, without requiring complex natural language processing (NLP) on a full volume of data in the unstructured data file. For example, identifying that "Mike Green" in a document may correspond to "Michael Greene" in structured records, based on associated locations, companies, or mutual connections.

The term "processing arrangement" refers to a hardware-software configuration comprising one or more processors and associated memory that collaboratively perform a sequence of data processing operations as disclosed herein. The processing arrangement may include dedicated subcomponents such as a reference data ingester, knowledge graph generator, entity-centric search query generator, and contextual matching engine. The processing arrangement enables the system to transform structured reference data into a knowledge graph, generate targeted semantic search queries, and apply those queries to received unstructured data files to assess contextual relevance. Notably, the processing arrangement supports modular, scalable, and automated semantic analysis, enabling the system to perform entity recognition and relationship mapping from the structured data file to filter content across large volumes of incoming unstructured data, without requiring complex NLP on the full volume of the unstructured data.

Throughout the present disclosure, the term "structured reference data" refers to organized, machine-readable information that follows a predefined data arrangement or organizational schema. For example, the structured reference data may include relational databases, spreadsheets, and the like records with clearly labeled fields and consistent data types. The structured reference data comprises identifiable entities such as individuals, companies, locations, and relationships among them. Typically, the identifiable entities are represented in a tabular or hierarchical structure that allows for precise extraction, categorization, and comparison. The structured reference data serves as the foundational input received from the reference data ingester from which the system derives real-world entities and their interconnections for processing the unstructured data file. In this regard, the term "reference data ingester" refers to a component or a module of the processing arrangement configured to receive and pre-process the structured reference data. The reference data ingester performs data handling tasks such as ingesting data from internal or external sources, validating data integrity, normalizing format discrepancies. This ensures that the structured reference data is in a consistent and usable format for further processing by the system. The reference data ingester may also support configurable input channels for different data source types (e.g., batch imports, API feeds, secure file transfers), allowing the system to flexibly integrate data from a variety of trusted sources.

Throughout the present disclosure, the term "knowledge graph" refers to a graph-based data structure that organizes and represents semantic relationships between the plurality of entities extracted from the structured reference data. The knowledge graph encodes the plurality of entities, attributes associated with the plurality of entities and logical or contextual relationships between the plurality of entities. Notably, in the knowledge graph, each node represents an entity (e.g., a person, organization, location, or contact), while each edge represents a meaningful relationship (e.g., "employed by," "resides at," "owns," "affiliated with") between two or more entities. The relationships may include metadata such as directionality, type, and confidence scores. It will be appreciated that the knowledge graph preserves inherent meaning of the data by mapping the structured schema (e.g., table rows, keys, columns) into a semantic network that can be queried, expanded, and traversed. The term "knowledge graph generator" refers to a specialized component or a module within the processing arrangement that is configured to generate the knowledge graph by parsing and interpreting the structure of the structured reference data. Optionally, the knowledge graph generator analyzes fields, headers, and relationships within tables, records, and schemas to identify which data elements constitute entities and how they are related. For example, if the structured reference data includes multiple transaction logs, the knowledge graph generator may identify sender and recipient names as entities, transaction amounts as attributes, and timestamps as temporal edges connecting the involved parties. Alternatively, the knowledge graph generator is configured to receive a user input from a user to indicate the fields, headers, and relationships within the tables, records, and schemas to identify which data elements constitute the entities and how they are related. Notably, the knowledge graph generator utilizes rule-based logic, schema recognition, or inference algorithms to transform raw structured data into a semantically connected graph structure, such as the knowledge graph. The term "plurality of different entities" refers to uniquely identifiable subjects that are represented within the structured reference data. These entities may include, but are not limited to, individuals (e.g., persons of interest), organizations (e.g., companies, institutions), places (e.g., cities, addresses), and objects (e.g., email addresses, phone numbers, account identifications (IDs)). Notably, each of the plurality of entities is distinguishable by one or more identifying attributes such as names, identifiers, roles, affiliations, or contact details, as found in the structured reference data.

Throughout the present disclosure, the term "entity-centric search query" refers to a query generated by the entity-centric search query generator to semantically match unstructured textual terms based on contextual basis of a particular entity. The entity-centric search query is generated based on the generated knowledge graph. Unlike conventional keyword queries, which rely on direct string matching, the entity-centric search query comprises semantic profile of a selected entity by including the entity's identifiers (e.g., names, aliases, IDs) the attributes (e.g., age, location, role), and related entities with defined relationships. For example, an entity-centric search query for an individual named "John Smith" might also include references to affiliated organizations, co-located addresses, financial transactions, or known associates. It will be appreciated that the entity-centric search query expresses a multi-dimensional profile of the particular entity that allows the system to locate contextually relevant references in unstructured data, even when explicit identifiers are sparse or missing. In this regard, the term "entity-centric search query generator" refers to a dedicated component or module within the processing arrangement configured to generate the entity-centric search query by extracting relevant elements from the knowledge graph. Optionally, the entity-centric search query generator may apply heuristics or graph traversal techniques to include direct attributes of the entity (e.g., name, age, address) as well as features from related nodes within a defined hop distance (e.g., business partners, related locations, shared transactions). The term "entity-related textual terms and parameters" refers to the collection of textual terms, attribute values, and relationship indicators used to form the entity-centric search query. The entity-related textual terms and parameters may include, for instance, string values such as entity names or aliases ("John Smith," "J. Smith"), role descriptors ("CEO"), locations ("New York"), and metadata derived from the structure of the graph (e.g., depth of relationships, relationship types, edge weights). The entity-related textual terms and parameters also include logical constructs that describe relationships between the textual terms for example, whether two terms must co-occur in proximity, the minimum number of matched relationships required for a high-confidence hit, or the relative importance (weighting) of specific features like names vs. locations.

Throughout the present disclosure, the term "contextual matching engine" refers to a specialized component or module within the processing arrangement configured to perform context-sensitive execution of the entity-centric search query on the received unstructured data file. Unlike conventional engines, the contextual matching engine interprets both semantic structure of the entity-centric search query and linguistic context of unstructured textual data to determine whether and how closely the data references a target entity. The outcome of the comparative analysis based on execution of the contextual matching engine is expressed quantitatively as the match score. In this regard, the term "match score" refers to a computed numerical or probabilistic value that indicates a degree of relevance or likelihood that the unstructured data file references or corresponds to the target entity represented in the entity-centric search query. The match score is typically computed using scoring functions that may comprise various dimensions, such as exact or fuzzy name matches, presence of associated entities or locations, semantic similarity of phrases or patterns and the like. For example, in a scenario, if the unstructured data file mentions the name "John Smith," along with related entities like "Jane Doe" and "ABC Investments" (all of which are connected in the entity's knowledge graph) then the contextual matching engine would assign a high match score, indicating a strong contextual correlation to the target entity. In contrast, if only the name "John Smith" is mentioned without any corroborating information, the match score would be significantly lower.

In an embodiment, the processing arrangement is further configured to:

determine, via a process selector of an unstructured data file processing engine, a process to be applied to the unstructured data file, using the match score; and process, via a plurality of process execution engines, the unstructured data file, using the determined process.

In this regard, the term “process selector” refers to a decision-making component or module of the unstructured data file processing engine (i.e., a decision making engine), configured to determine the process to be applied for processing the unstructured data file. Herein, the process is a processing path or operation to be applied to the received unstructured data file based on the match score. For example, the process may determine whether the unstructured data file is to be enriched, stored, flagged, discarded, or subjected to further analysis, based on the match score that shows an amount of matching or relation of the unstructured data file to the known entity from amongst the plurality of entities. The process selector may utilize configurable thresholds or rules to map the match score to a particular process. For instance, if the match score exceeds a predefined threshold that shows high-confidence, the process selector may assign the unstructured data file to a first process (e.g., Process A), such as entity profile enrichment or knowledge graph feedback update. Conversely, if the match score falls below the predefined threshold, the unstructured data file may be sent to a second process (e.g., Process B), such as content quarantine or deletion via the plurality of process execution engines. Herein, the term “plurality of process execution engines” refers to multiple discrete or modular software components that carry out specific operations or processes on the unstructured data file once the process has been determined. The plurality of process execution engines may include, for example, a knowledge graph enricher (to add new entity connections or attributes), a security filter (to analyze file contents for threats), a classification engine (to categorize the file), or a logging engine (to generate audit records). It may be appreciated that each of the plurality of process execution engines is capable of performing specialized tasks tailored to nature of the unstructured data file and its contextual relevance. A technical advantage is that the semantic data processing is enhanced by ensuring that the unstructured data files are processed in a context-aware, and purpose-specific manner, directly informed by the match score.

In an embodiment, the processing arrangement is further configured to employ a pre-processing function associated with the reference data ingester for data cleansing and standardization of the structured reference data. In this regard, the term “pre-processing function” refers to a set of operations performed on the structured reference data prior to its ingestion into the system. The pre-processing function is responsible for acquiring, validating, and preparing the structured reference data for further processing. The pre-processing function may be implemented as a dedicated software module or as part of a larger data ingestion pipeline. Herein, data cleansing and standardization may include the removal of duplicate records, correction of misspellings or malformed entries, resolution of formatting irregularities, and elimination of null or missing values in the structured reference data. For example, if entity names such as “J. Smith,” “John Smith,” and “John S.” appear in separate rows, data cleansing may normalize these to a consistent canonical form in the structured reference data prior to further processing. Additionally, address formats, date representations, or company names in the structured reference data may be converted to a standard syntax or taxonomy that the processing arrangement can reliably interpret. It may be appreciated that integrating the pre-processing function directly with the reference data ingester ensure that only clean and standardized structured reference data is passed forward into knowledge graph generation pipeline. A technical effect is that noise and redundancy is reduced in the structured reference data.

In an embodiment, the processing arrangement comprising an entity resolution processor configured to identify entities within the structured reference data and perform deduplication of structured reference data relating to the same entity. In this regard, the term “entity resolution processor” refers to a dedicated software module or component configured to perform the process of identifying and linking records in the structured reference data that refer to the same entity, despite variations in naming, formatting, or data completeness. The entity resolution processor ensures that the knowledge graph generated by the system accurately represents unique entities without duplication or ambiguity. The entity resolution processor may use techniques such as deterministic rules, probabilistic matching, machine learning algorithms, or natural language processing heuristics to group data records that are likely to refer to the same entity. For example, the entity resolution processor may resolve entries like ‘ABC Ltd.’ and ‘ABC Limited’ as the same company, or group ‘Jon Smith’ and ‘John Smith’ as likely to be same person, depending on supporting context. A technical advantage of identifying entities and performing deduplication is that a coherent and non-redundant knowledge graph is generated.

In an embodiment, the processing arrangement is further configured to pass back attributes learned from a process of entity resolution to the pre-processing function, by employing the entity resolution processor, to improve data cleansing and standardization of the reference data.

In this regard, the term “process of entity resolution” refers to an operation or process performed by the entity resolution processor. Herein, feedback mechanism of passing back the attributes learned comprises reusing insights or refined data characteristics identified during the entity resolution process to improve processes, specifically the data cleansing and standardization. The attributes may include resolved canonical names, normalized formats, frequent entity variants, or confidence scores related to entity identity. For example, if the entity resolution processor identifies that the terms “IBM Ltd.” and “International Business Machines” consistently refer to the same organization, the entity resolution processor may generate a rule or mapping that is passed back to the pre-processing function to automatically normalize such entries in future incoming data. A technical effect of the aforementioned feature is to iteratively enhance quality and consistency of data, promote data harmonization across reference structured data ingested at different times or from disparate sources.

In an embodiment, the entity resolution processor uses at least one of: a machine learning technique, a natural language processing (NLP) technique, a heuristic technique, a classifier technique to perform the entity resolution on the structured reference data. In this regard, the term “machine learning technique” includes supervised, unsupervised, or semi-supervised algorithms such as decision trees, random forests, support vector machines, clustering algorithms, or neural networks trained to recognize patterns in representation of entities across data sources. The term “natural language processing (NLP) technique” refers to computational approaches for analyzing and interpreting human language data, such as tokenization, part-of-speech tagging, named entity recognition, or word embeddings, which are used to identify and compare semantic similarity between entity names or attributes. The term "heuristic technique" refers to rule-based methods or logical approximations used to infer equivalence between different data entries based on predefined conditions or patterns, such as string similarity thresholds, acronym expansion, or nickname matching. The term "classifier technique" refers to a type of supervised machine learning approach wherein a model is trained on labeled data to classify whether two given data entries refer to the same entity or not, based on features such as name similarity, attribute overlap, or contextual associations. A technical effect of employing multiple such techniques by the entity resolution processor is to improve robustness and accuracy of entity matching across noisy, incomplete, or variably formatted data sources, thereby enhancing the reliability of the knowledge graph built from the structured reference data.

In an embodiment, the processing arrangement is further configured to generate a strength score relating to a strength of relationship between the entity-centric search query and the textual content of the unstructured data file, and to filter out any textual content having the strength below a defined threshold by employing the knowledge graph generator. In this regard, the term "strength of relationship" refers to a quantified measure or score that reflects a semantic or contextual closeness between an entity-centric search query and the textual content of the unstructured data file. The strength of a relationship may be computed based on a number of matching attributes, a type of relationship (e.g., direct vs. indirect), frequency of co-occurrence, or a weighted similarity model defined in the knowledge graph. Notably, the strength is utilized for selective exclusion of unstructured textual segments, entities, or entire data files that fall below the defined threshold, thereby ensuring that only semantically relevant data is passed to downstream processing stages. Herein, the term "defined threshold" refers to a configurable parameter or preset score boundary used to determine whether the determined strength of relationship is sufficient to consider the textual content relevant for further processing. The defined threshold may vary depending on use case sensitivity, risk tolerance, or application-specific criteria. For example, the defined threshold may be a preset value within the system or may be set by a user depending upon use case sensitivity. A technical effect of determining the strength of relationships and filtering content below the defined threshold is to reduce noise in data processing, improve matching precision, and optimize system resources by avoiding unnecessary processing of irrelevant or weakly related unstructured data.

In an embodiment, the processing arrangement is further configured to parse the knowledge graph and generate an entity-centric knowledge graph by employing an entity centric knowledge graph generator, and wherein the entity-centric knowledge graph specifies a specific entity and other related entities having close associations with the specific entity as defined by the relationship data. In this regard, the term "entity-centric knowledge graph generator" refers to a functional component that parses the knowledge graph and extracts or synthesizes a more focused subgraph such as the entity-centric knowledge graph centered on the specific entity. Herein, the term "entity-centric knowledge graph" refers to a subset of the knowledge graph that is focused on a specific entity of interest. The entity-centric knowledge graph may include a set of directly or indirectly connected entities along with the specific entity of interest, as defined by relationship data. The entity-centric knowledge graph organizes and presents relevant contextual information that can be used for downstream semantic matching and processing. The entity-centric knowledge graph uses the relationship data to determine which related entities and connections are relevant enough to be of importance to the specific entity of interest. A technical effect of parsing the knowledge graph into the entity-centric knowledge graph is that processing complexity is reduced and the semantic specificity during the contextual matching process is enhanced.

In an embodiment, the processing arrangement is further configured to receive the unstructured data file from an external source, via an unstructured data file pre-processor. In this regard, the term "external source" refers to any external system, repository, or service that provides the unstructured data files to the semantic data processing system. The external source may include web crawlers, enterprise content management systems, watchlists, third-party feeds, or networked storage repositories. The system utilizes the unstructured data file pre-processor to receive the unstructured data file. Herein, the term "unstructured data file pre-processor" refers to a dedicated component or module of the system configured to receive the unstructured data file. The unstructured data file pre-processor may also perform initial actions such as format normalization, metadata tagging, file-type validation, and content extraction. A technical effect of incorporating the unstructured data file pre-processor for reception of the unstructured data file is to ensure that such files are in a standardized, processable format that enhances the effectiveness of indexing and semantic matching.

In an embodiment, the unstructured data file pre-processor comprises a data indexer, configured to create an unstructured data search index of the textual contents of the unstructured data file. In this regard, the term "data indexer" refers to a functional component within the unstructured data file pre-processor configured to generate a searchable index of the textual content contained within the unstructured data files. The data indexer may implement techniques such as tokenization, keyword extraction, and term-frequency mapping to organize textual content in a format compatible with search execution. Herein, the term "unstructured data search index" refers to a structured representation of the textual content within the unstructured data file. The unstructured data search index is typically organized using tokenization, keyword-frequency mappings, inverted indexing, or semantic vector representations. Notably, the unstructured data search index enables fast lookup and matching of query terms during subsequent execution of the entity-centric search query. For example, if the unstructured data file contains a news article about "John Smith, CEO of ABC Investments Inc.," the data indexer may identify key tokens such as names, company affiliations, locations, and relationships, and store them in an optimized structure that supports contextual search queries. This avoids the need to repeatedly scan the full text at runtime. A technical effect of creating the unstructured data search index from the unstructured data file is to enable efficient execution of the entity-centric search query, thereby reducing latency and improving match accuracy during contextual matching.

In an embodiment, the contextual matching engine comprises a search engine configured to execute the entity-centric search query and to output the match score to the unstructured data file processing engine, wherein the search engine comprises a data comparator for comparing the entity-centric search query against the unstructured data search index and a search results scorer to assign the match score to the result of the search. In this regard, the term "search engine" refers to a subsystem or module within the contextual matching engine that is configured to execute the entity-centric search query against the unstructured data search index to identify text segments within unstructured data files that are semantically and relationally relevant to a structured entity. Notably, the search engine as described herein does not require the unstructured data to be stored in a relational form, which enables it to execute the entity-centric search query against the unstructured data search index, without requiring the unstructured data to be turned into structured data.

The term "data comparator" refers to a functional component or submodule within the search engine configured to compare the textual tokens and relationship structures defined in the entity-centric search query against those indexed in the unstructured data search index. The comparison may account for partial matches, synonyms, spelling variations, and relational proximity (e.g., determining if a name appears in conjunction with a known associate or company). Further, the term "search results scorer" refers to a logic-based scoring module configured to evaluate a degree of relevance between the entity-centric search query and the matched data segment and assign the match score. The scoring may be based on a variety of factors, such as a number of matching attributes, depth of relationship hops from the central entity, contextual overlaps, and weighted relevance of specific terms (e.g., entity name vs. associated location). A technical effect is that the system produces a quantitative measure of relevance between structured reference data and the textual content, enabling differentiated processing decisions.

In an embodiment, the contextual matching engine comprises further filters configured to filter the scored search results to remove the received unstructured data file from further processing, if the results indicate that the unstructured data file is not of further relevance to the knowledge graph. In this regard, the term "further filters" refers to a configurable logical or rule-based layer within the contextual matching engine that is designed to apply additional evaluation criteria to the scored search results produced after execution of the entity-centric search query. The further filters are used to determine whether a matched unstructured data file should be retained for further processing or excluded based on specific, user-defined relevance criteria or operational thresholds. The further filters may include thresholds, exclusion lists, content-type checks, or context-based rules that determine whether a result is to be further processed. Optionally, the unstructured data file is dropped based on determining that the content of the unstructured data file falls below a configured threshold of semantic relevance or match confidence and, therefore, does not require further resource allocation. A technical effect of employing further filters is that a computational efficiency and resource usage is optimized by discarding irrelevant or low-quality matches early in the pipeline, and thus, improving overall throughput and response time of the system.

In an embodiment, the further filters are configurable by a plurality of further filter parameters provided in the semantic data processing system. In this regard, the term "plurality of further filter parameters" refers to a set of tunable configuration inputs or thresholds that guide the operation of the further filters. The plurality of further filter parameters may include, for example, a minimum acceptable match score, entity type restrictions, temporal constraints (e.g., the age of a document), language settings, source reputation, or topic relevance. Notably, the plurality of further filter parameters may be adjusted by system administrators or domain experts depending on the context and sensitivity of the plurality of entities being investigated. For instance, in a financial compliance context, the plurality of further filter parameters may be set to exclude articles older than six months or published by unverified sources, even if they contain relevant entity matches. Conversely, in cybersecurity monitoring, the parameters may be adjusted to allow inclusion of lower confidence matches if the file originates from a high-risk domain.

A technical effect of allowing the further filters to be configurable by the plurality of further filter parameters is to enable the system to dynamically align with evolving risk criteria, organizational policies, or regulatory frameworks, thereby allowing it to be tailored to specific use cases, risk tolerances, or domain requirements.

In an embodiment, the unstructured data file processing engine comprises a knowledge graph enricher configured to update the knowledge graph with data from the processed unstructured data file, based on an input from a user. In this regard, the term "knowledge graph enricher" refers to a component of the unstructured data file processing engine configured to enhance or update the knowledge graph using insights extracted from the processed unstructured data files. The process of updating the knowledge graph may include addition of new entities, relationships, or attribute values that were not originally present in the structured reference data. The knowledge graph enricher thereby improves completeness, relevance, and semantic richness of the knowledge graph. For example, when the processed unstructured data file reveals a previously unidentified association between an existing entity (e.g., a company) and a new related entity (e.g., a supplier), the knowledge graph enricher can incorporate the previously unidentified association into the knowledge graph, tagging it with metadata such as timestamp, source file ID, and user confirmation status. The knowledge graph is updated based on the input from the user. Herein, the input may include confirmation of new relationships, correction of erroneous links, or annotation of contextual meaning. For example, the user such as a compliance analyst reviewing a news article may confirm that a mentioned individual is indeed affiliated with a sanctioned entity and instruct the system to update the knowledge graph accordingly. Optionally, the knowledge graph is auto-updated without the input from the user, when the match score is more than a predefined threshold. Notably, an ability to enrich the knowledge graph using real-world contextual data extracted from the processed unstructured data files enables the system to grow more intelligent and context-aware over time. Optionally, the knowledge graph is auto-updated without the input from the user, when the match score is more than a predefined threshold A technical effect of incorporating the knowledge graph enricher is that a continual learning is enabled and the precision of contextual matching is enhanced.

In an implementation example, the unstructured data file in form of two published articles (namely, article 1 and article 2) are compared to show a strong match and a weak match, the two published article are as follow:

Article 1: John Smith Arrested for Drug Dealing and Money Laundering in Relation to Investment Companies Set Up in San Diego. April 2022

Last night John Smith was arrested on drug and money laundering charges in connection with activity linked to Mexican drug cartels. According to the investigation, large quantities of Class A drugs were smuggled into the US by a drug trafficking organization affiliated with a cartel from Mexico City. To move the drug money around Smith set up a number of investment companies that were used to wash the money and transfer it back to Mexico. Smith was arrested at his home in Denver Colorado with his wife Jane Doe. The scheme operated from April to November last year and follows the conviction of Mike Green, a citizen from Mexico who was recently extradited back to the country. Smith has been remanded in custody pending a hearing next week.

Article 2: Tom Davis and John Smith Arrested in Connect to Large Vehicle Theft Ring in Miami, Florida. May 2022

Tom Davis and John Smith, from Miami FL were arrested last week on suspicion of running a large vehicle theft organization in downtown Miami. Over the course of the last year there has been a significant increase in the number of vehicle thefts in certain neighbourhoods within Miami. The ring targeted specific vehicles that were vulnerable to key cloning attacks and used highly sophisticated methods to gain access to the vehicles. Davis and Smith were both arrested at their place of work Sunshine Auto Repairs, in Miami, and are believed to have used company equipment to facilitate these thefts. They have been released on bail pending their hearing next month.

Herein, the semantic data processing system is configured to evaluate the relevance of unstructured data file by leveraging an entity-centric knowledge graph (ECKG) associated with a target entity. For instance, if the ECKG for John Smith (that is derived from the structured data) shows that he shares an address and has financial transactions with Jane Doe and is also CEO of an investment company, which also has a Michael Green as a director, this information is used to produce an entity-centric search query.

Now consider the two published articles, each referring to an individual named "John Smith." The article 1 includes the name "John Smith" as well as additional contextual information such as references to "Jane Doe" (who, according to the ECKG, shares an address and has financial transactions with John Smith), mentions of "San Diego" (an address of a company where John Smith serves as CEO), and references to "investment companies" (aligning with John Smith's role as CEO of a company with "investments" in its name). The Article 1 also mention "Mike Green," who is a director at the company, and "Mexico City," which is relevant because a director is based there, even though John Smith himself is not directly associated with that location. The presence of these corroborating details, which align with relationships and attributes encoded in the ECKG, enables the contextual matching engine to assign a high match score, indicating a strong likelihood that the unstructured data file is relevant to the target entity.

Conversely, the article 2 also mentions "John Smith" however lacks any additional corroborating information found in the ECKG such as related persons, organizations, or locations. According to article 2, the contextual matching engine determines that there are few or no overlapping characteristics, resulting in a low match score that the article 2 pertains to the target entity "John Smith". Based on the match scores, the process selector can apply different processing strategies to each article, such as enriching the knowledge graph with new associations for high confidence matches or discarding files with weak or irrelevant connections.

In a second aspect, the present disclosure provides a computer-implemented method for processing an unstructured data file based on semantics of textual content of the unstructured data file, the method comprising:

- receiving structured reference data, via a reference data ingester;
- receiving unstructured data files via an unstructured data file preprocessor;
- generating a knowledge graph from the structured reference data using knowledge of the structure of the structured reference data, the knowledge graph specifying a plurality of different entities having relationships with each other and relationship data linking the different entities;
- generating an entity-centric search query by using the knowledge graph, the entity centric search query specifying a plurality of entity-related textual terms and parameters regarding the relationships between the entity-related textual terms;
- executing the entity-centric search query on the received unstructured data file; and
- generating a match score relating to the relevance of textual content of the unstructured data file to the entity-centric search query.

The present disclosure also relates to the computer-implemented method as described above. Various embodiments and variants disclosed above, with respect to the aforementioned semantic data processing system, apply mutatis mutandis to the computer-implemented method.

The present disclosure provides the aforementioned computer-implemented method for processing a received unstructured data file based on the semantics of its textual content, thereby enabling highly accurate and context-aware identification of entities within unstructured data sources. The computer-implemented method achieves this by generating a knowledge graph from structured reference data, extracting relationships between plurality of entities and then leveraging the knowledge graph to construct entity-centric search queries that encode both entity identifiers and relational semantics. By executing the entity-centric query on unstructured data file, the computer-implemented method allows for context-based matching of relevance rather than relying solely on literal or keyword matches and with no requirement to perform any structuring, entity extraction, relationship extraction or complex processing on the unstructured data.

The computer-implemented method further enhances matching precision by incorporating multi-hop relationship information and filtering content based on a configurable match score. An ability of the computer-implemented method to resolve entity duplications and inconsistencies in the structured reference data ensures that the generated knowledge graph is accurate and reliable. The synergistic interaction between data ingestion, knowledge graph generation, search query generation, and contextual matching ensures that the computer-implemented method is able to operate effectively on noisy or sparse textual content, such as media articles, case files, or intelligence reports. As a result, the method empowers enterprises and analysts to derive actionable insights from unstructured sources with reduced manual intervention, improved semantic fidelity.

In an embodiment, the method further comprises:

- determining a process to be applied to the unstructured data file, using the match score; and
- processing the unstructured data file, using the determined process.

In an embodiment, the receiving step comprises a pre-processing step, the pre-processing step comprising data cleansing and standardization of the structured reference data.

In an embodiment, the computer-implemented method further comprises an entity resolution step, the entity resolution step comprising an entity resolution processor for identifying entities within the reference structured data and performing deduplication of reference data relating to the same entity.

In an embodiment, the entity resolution step uses at least one of: a machine learning technique, a natural language processing (NLP) technique, a heuristic technique, a classifier technique to perform the entity resolution on the structured reference data.

In an embodiment, the step of generating the knowledge graph comprises generating a strength score relating to the strength of a relationship between the entity-centric search query and the textual content of the unstructured data file, and filtering out any textual content having a strength below a defined threshold.

In an embodiment, the computer-implemented method further comprises an entity-centric knowledge graph generating step which comprises parsing the knowledge graph and generating an entity-centric knowledge graph which specifies a specific entity and other related entities having close associations with the specific entity as defined by the relationship data.

In an embodiment, the computer-implemented method further comprises receiving the unstructured data file from an external source.

In an embodiment, the computer-implemented method further comprises creating an unstructured data search index of the textual contents of the unstructured data file.

In an embodiment, the step of executing the entity-centric search query comprises comparing the entity-centric search query against the unstructured data search index and assigning the match score to the result of the search.

In an embodiment, the computer-implemented method further comprises updating the knowledge graph with data from the processed unstructured data file, based on an input from a user.

In a third aspect, the present disclosure provides a non-transitory machine-readable storage medium, comprising computer-readable instructions that, when executed by one or more processors, cause the semantic data processing system of the first aspect to carry out the computer-implemented method of the second aspect.

The present disclosure also relates to the non-transitory machine-readable storage medium as described above. Various embodiments and variants disclosed above, with respect to the aforementioned semantic data processing system and the aforementioned computer-implemented method, apply mutatis mutandis to the non-transitory machine-readable storage medium.

The present disclosure provides the aforementioned non-transitory machine-readable storage medium that stores computer-executable instructions for implementing the semantic data processing system. By storing the computer-readable instructions in a portable, reusable software form, the non-transitory machine-readable storage medium ensures consistency and repeatability in system behavior across deployments, enabling seamless integration into various computing environments such as enterprise platforms, cloud-based systems, or edge analytics devices. This facilitates rapid scaling and deployment of the semantic data processing system without requiring hardware redesign or manual system reconfiguration. Additionally, the stored instructions enable reliable automation of semantic matching tasks, thereby reducing operational costs, improving auditability, and accelerating time-to-insight when processing large volumes of unstructured data.

In a fourth aspect, the present disclosure provides a semantic data processing system for processing a received unstructured data file based on semantics of textual content of the unstructured data file, the system comprising a processing arrangement configured to:

- receive, via a reference data ingester, structured reference data;
- receive unstructured data files via an unstructured data file preprocessor;
- generate, via a knowledge graph generator, a knowledge graph from the structured reference data using structure of the structured reference data, the knowledge graph specifying a plurality of different entities having relationships with each other and relationship data linking the different entities;
- generate, via an entity-centric search query generator, an entity-centric search query by using the knowledge graph, the entity-centric search query specifying a plurality of entity-related textual terms and parameters regarding the relationships between the entity-related textual terms; and
- execute, via a contextual matching engine, the entity-centric search query on the received unstructured data file to generate a match score relating to the relevance of textual content of the unstructured data file to the entity-centric search query.

In a fifth aspect, the present disclosure provides a computer-implemented method for processing a received unstructured data file based on semantics of textual content of the unstructured data file, the method comprising:

- receiving structured reference data;
- generating a knowledge graph from the structured reference data using knowledge of the structure of the structured reference data, the knowledge graph specifying a plurality of different entities having relationships with each other and relationship data linking the different entities;
- generating an entity-centric search query by using the knowledge graph, the entity centric search query specifying a plurality of entity-related textual terms and parameters regarding the relationships between the entity-related textual terms;
- executing the entity-centric search query on the received unstructured data file; and
- generating a match score relating to the relevance of textual content of the unstructured data file to the entity-centric search query.

DETAILED DESCRIPTION OF THE DRAWINGS

Referring to FIG. 1, illustrated is a block diagram 100 showing an environment where a semantic data processing system 102 is implemented, in accordance with an embodiment of the present disclosure. As shown, the semantic data processing system 102 is configured to process an unstructured data file 104 received for processing based on semantics of textual content. The semantic data processing system 102 comprises a processing arrangement 106 configured to receive structured reference data 108 through a reference data ingester 106A. As further shown, the processing arrangement 106 comprises a knowledge graph generator 106B configured to generate a knowledge graph from the structured reference data 108. The processing arrangement 106 also comprises an entity-centric search query generator 106C configured to generate a search query based on entities and relationships represented in the knowledge graph. Additionally, the processing arrangement 106 includes a contextual matching engine 106D configured to perform contextual matching of the unstructured data file 104 using the search query and the semantics derived from the structured reference data 108. The semantic data processing system 102 utilizes a communication network 110 for receiving the unstructured data file 104 and the structured reference data 108. The semantic data processing system also comprises a data storage 112 configured to store the structured reference data 108, the unstructured data file 104, and the generated knowledge graph for further processing and retrieval. Optionally, the data storage may also be implemented outside the semantic data processing system 102. In this regard, the semantic data processing system 102 is communicatively coupled to the data storage 112 via the communication network 110.

Figure 2:
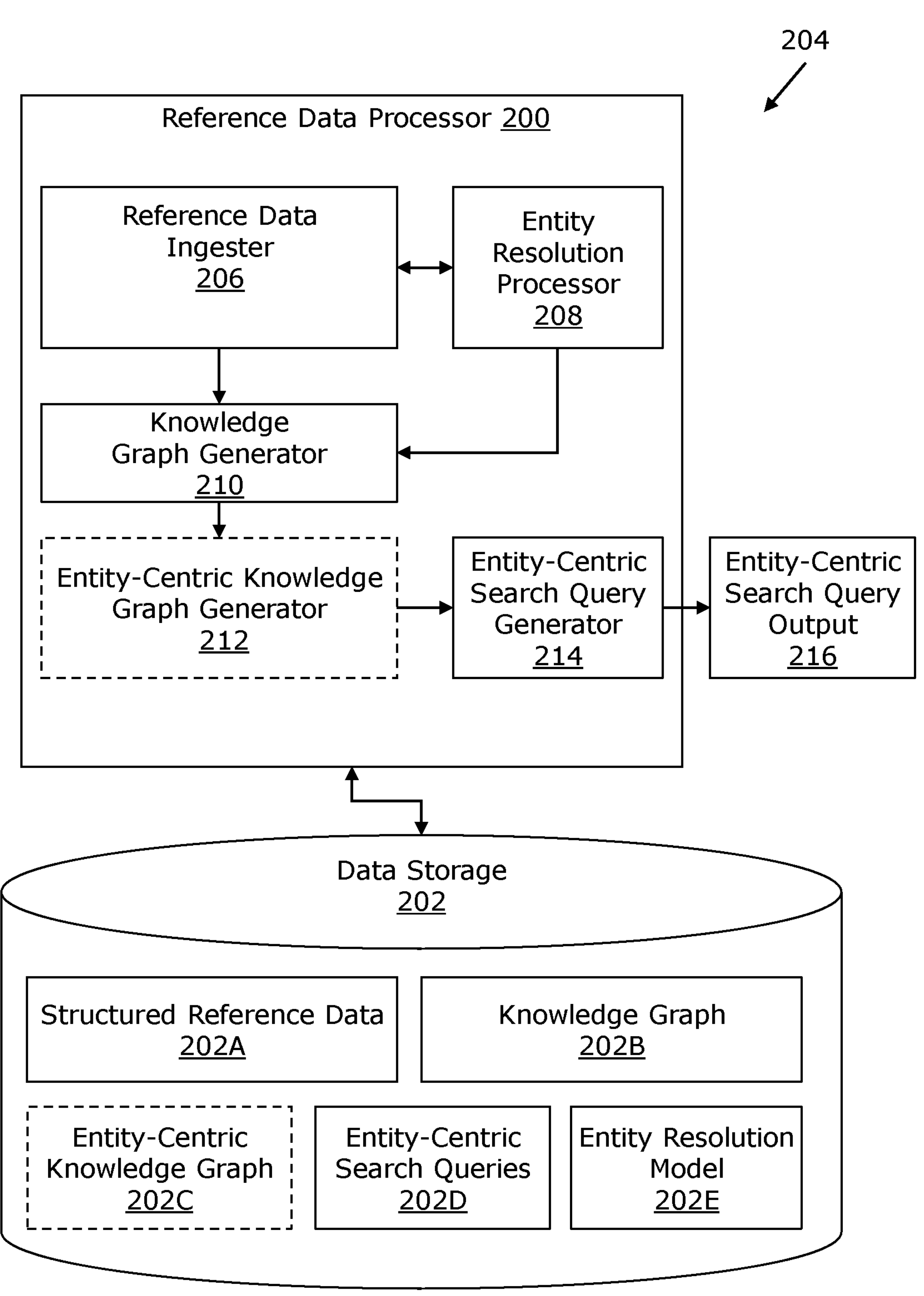
FIG. 2 is an illustration of block diagram representing components of a reference data processor and a data store of the semantic data processing system, in accordance with an embodiment of the present disclosure.

Referring to FIG. 2, illustrated is a block diagram representing components of a reference data processor 200 and a data storage 202 in a semantic data processing system 204, in accordance with an embodiment of the present disclosure. As shown, the semantic data processing system 204 includes a Reference Data Processor 200, which comprises a Reference Data Ingester 206, an Entity Resolution Processor 208, a Knowledge Graph Generator 210, an Entity-Centric Knowledge Graph Generator 212, an Entity-Centric Knowledge Graph Generator and an Entity-Centric Search Query Generator 214. The Entity-Centric Search Query Generator 214 is configured to generate an Entity-Centric Search Query Output 216, which is used for contextual matching of unstructured data. The Reference Data Processor 200 is communicatively coupled to a Data Storage 202, which stores intermediate and final data structures used in the semantic data processing workflow. Specifically, the Data Storage 202 comprises Structured Reference Data 202A, a Knowledge Graph 202B, an Entity-Centric Knowledge Graph 202C, Entity-Centric Search Queries 202D, and an Entity Resolution Model 202E.

Figure 3:
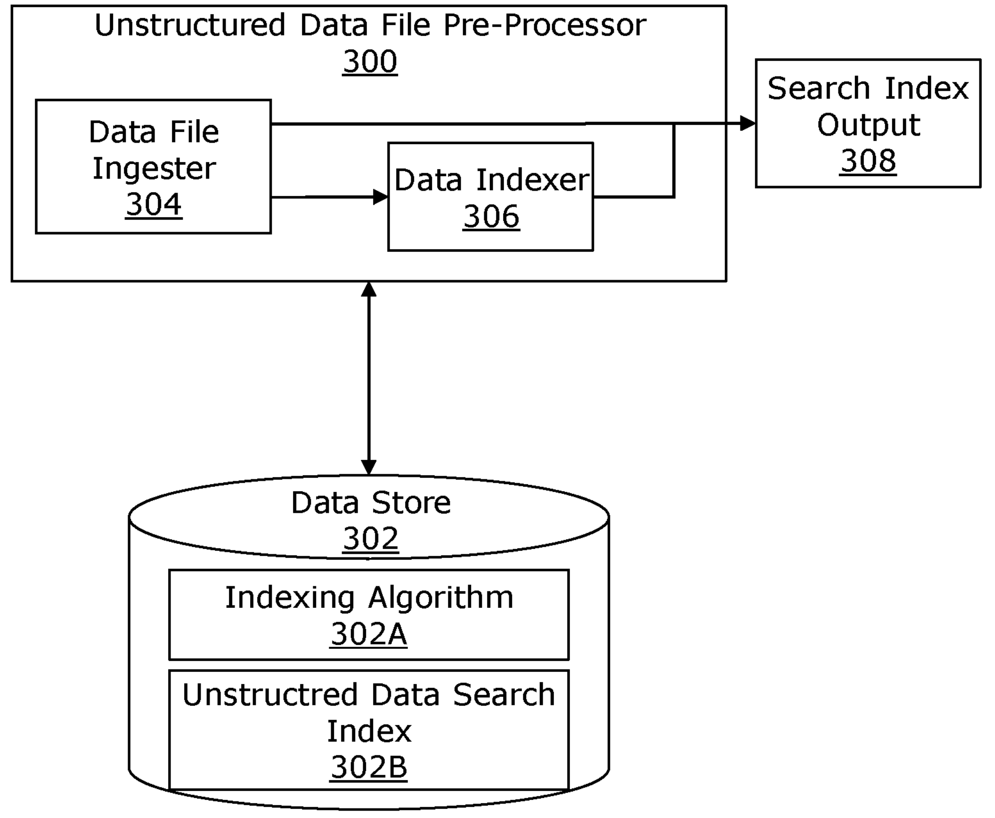
FIG. 3 is a schematic illustration of a block diagram representing components of an unstructured data file preprocessor and a data storage, in accordance with an embodiment of the present disclosure.

Referring to FIG. 3, illustrated is a schematic block diagram representing components of an unstructured data file pre-processor 300 and a data storage 302, in accordance with an embodiment of the present disclosure. As shown, the unstructured data file pre-processor 300 comprises a data file ingester 304 configured to receive unstructured data files from one or more external sources. The received unstructured data file is further processed by a data indexer 306, which is configured to generate a searchable index of textual content contained within the unstructured data files. The data indexer 306 utilizes an indexing algorithm 302A to create a search index output 308, which is stored as an unstructured data search index 302B within the data storage 302. The data storage 302 is further configured to store the processed unstructured data files and corresponding search indices for subsequent retrieval and contextual matching. Optionally, the unstructured data file pre-processor 300 enables efficient and scalable indexing of textual content of unstructured data file.

Figure 4:
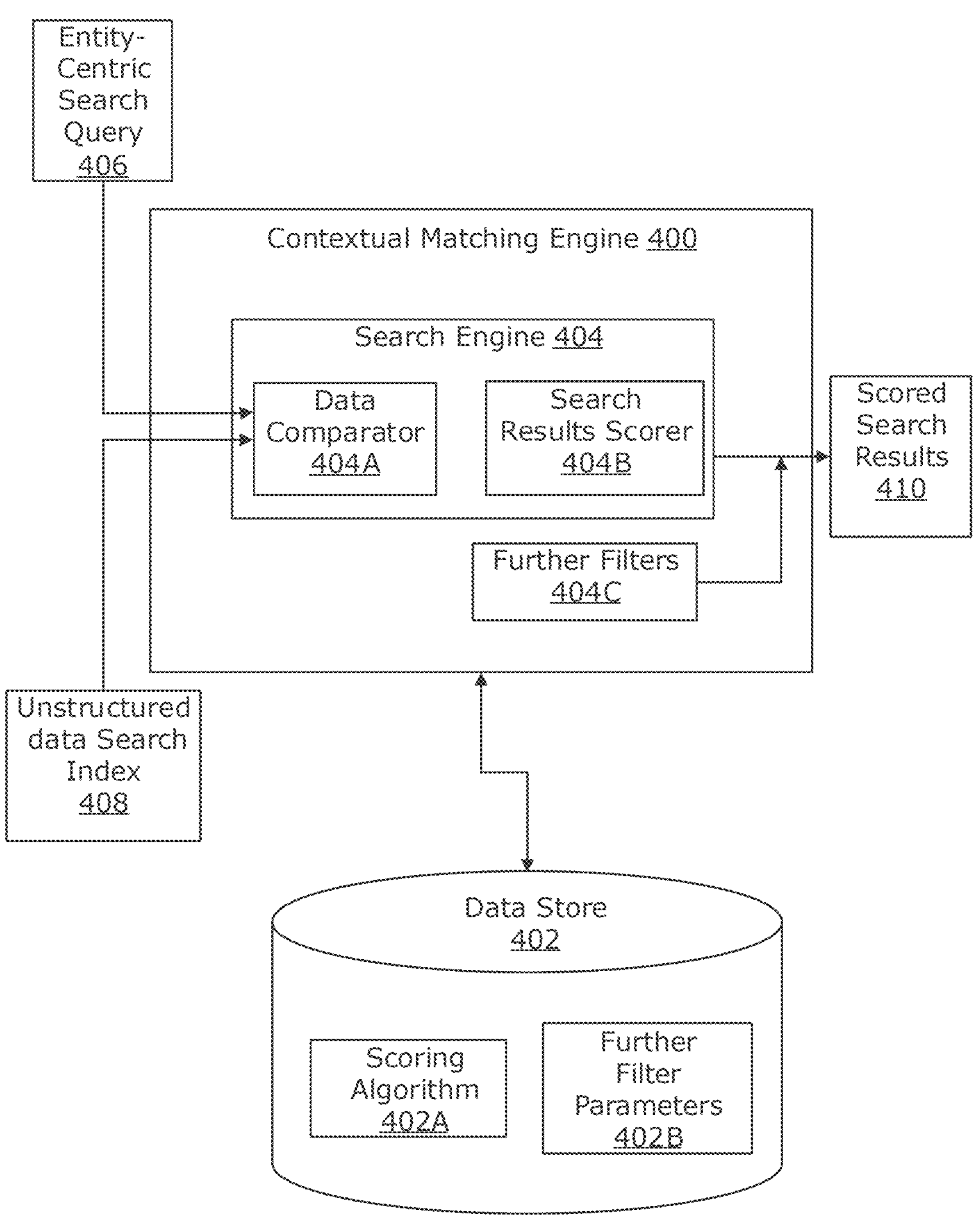
FIG. 4 is a schematic illustration of block diagram representing components of a contextual matching engine and an associated data storage, in accordance with an embodiment of the present disclosure.

Referring to FIG. 4, illustrated is a schematic block diagram representing components of a contextual matching engine 400 and a data storage 402, in accordance with an embodiment of the present disclosure. As shown, the contextual matching engine 400 comprises a search engine 404 configured to execute entity-centric search queries 406 against a search index of a data file 408. The search engine 404 includes a data comparator 404A for comparing the entity-centric search query 406 with the unstructured data search index 408, and a search results scorer 404B for assigning match scores to the results of the search. The scored search results 410 are then processed by further filters 404C, which are configured to filter out results that do not meet predefined relevance criteria. The operation of the further filters 404C is governed by a scoring algorithm 402A and further filter parameters 402B, both of which are stored in the data storage 402. The data storage 402 is further configured to store the search results and associated parameters for subsequent processing, which enables the contextual matching engine 400 to efficiently evaluate the semantic relevance of unstructured data files, assign quantitative match scores, and selectively filter results to optimize downstream processing within the semantic data processing system.

Figure 5:
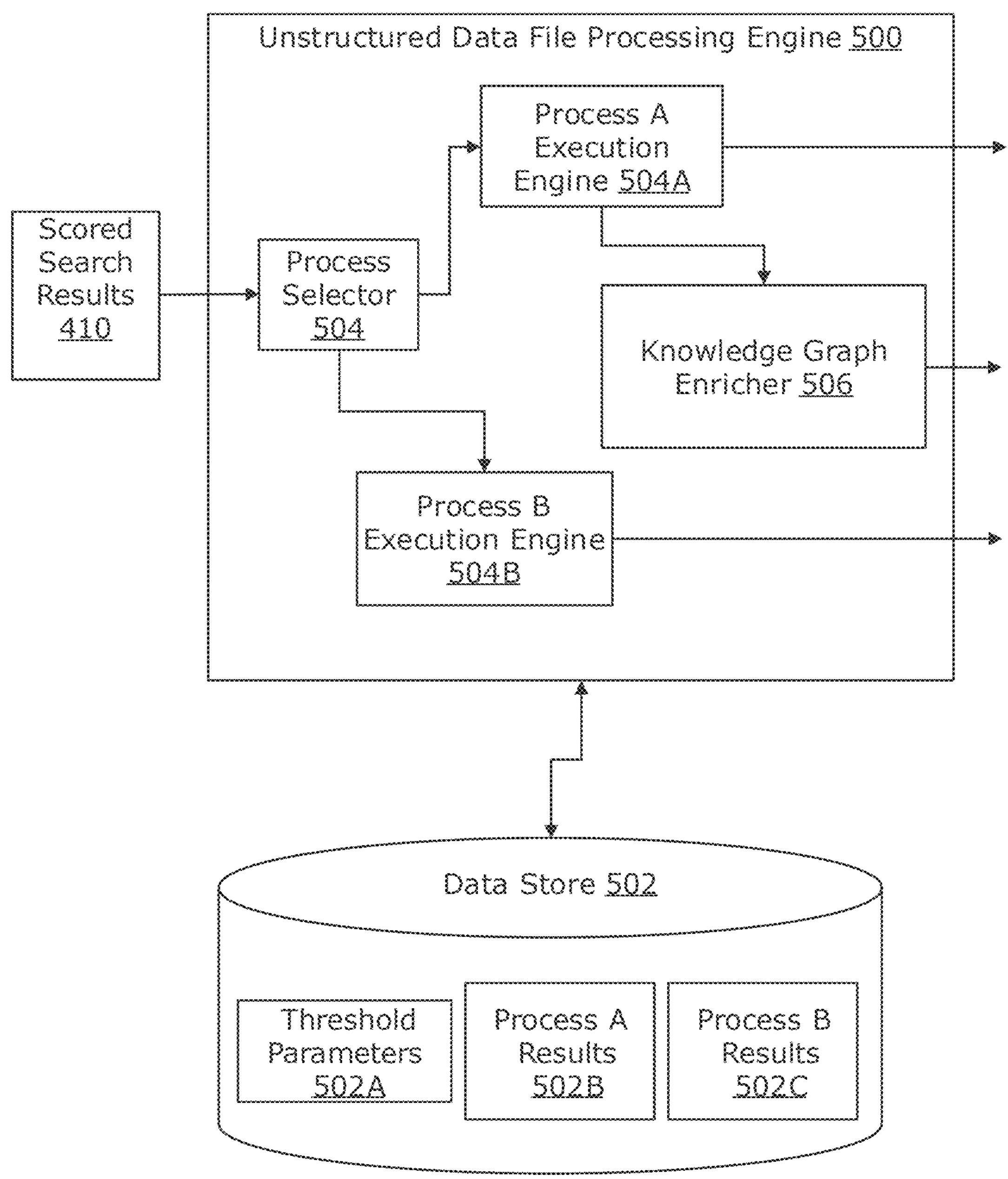
FIG. 5 is an illustration of a block diagram representing components of an unstructured data file processing engine and an associated data storage, in accordance with an embodiment of the present disclosure.

Referring to FIG. 5, illustrated is a schematic block diagram representing components of an unstructured data file processing engine 500 and an associated data storage 502, in accordance with an embodiment of the present disclosure. As shown, the unstructured data file processing engine 500 (i.e., a decision-making engine) comprises a process selector 504 configured to determine, based on the scored search results 410 of FIG. 4 and threshold parameters 502A, which processing path is to be applied to a given unstructured data file. The process selector 504 directs the data file to either a process A execution engine 504A or a process B execution engine 504B, depending on the match score and relevance. The process A execution engine 504A and process B execution engine 504B are configured to perform distinct processing operations, with their respective results being stored as process A results 502B and process B results 502C in the data storage 502. Additionally, the unstructured data file processing engine 500 includes a knowledge graph enricher 506, which is configured to update the knowledge graph with new data or relationships identified during processing, thereby enhancing the semantic richness and accuracy of the system. The data storage 502 is further configured to store scored search results, threshold parameters, and the outcomes of the various processing paths for future reference and system learning.

Figure 6:
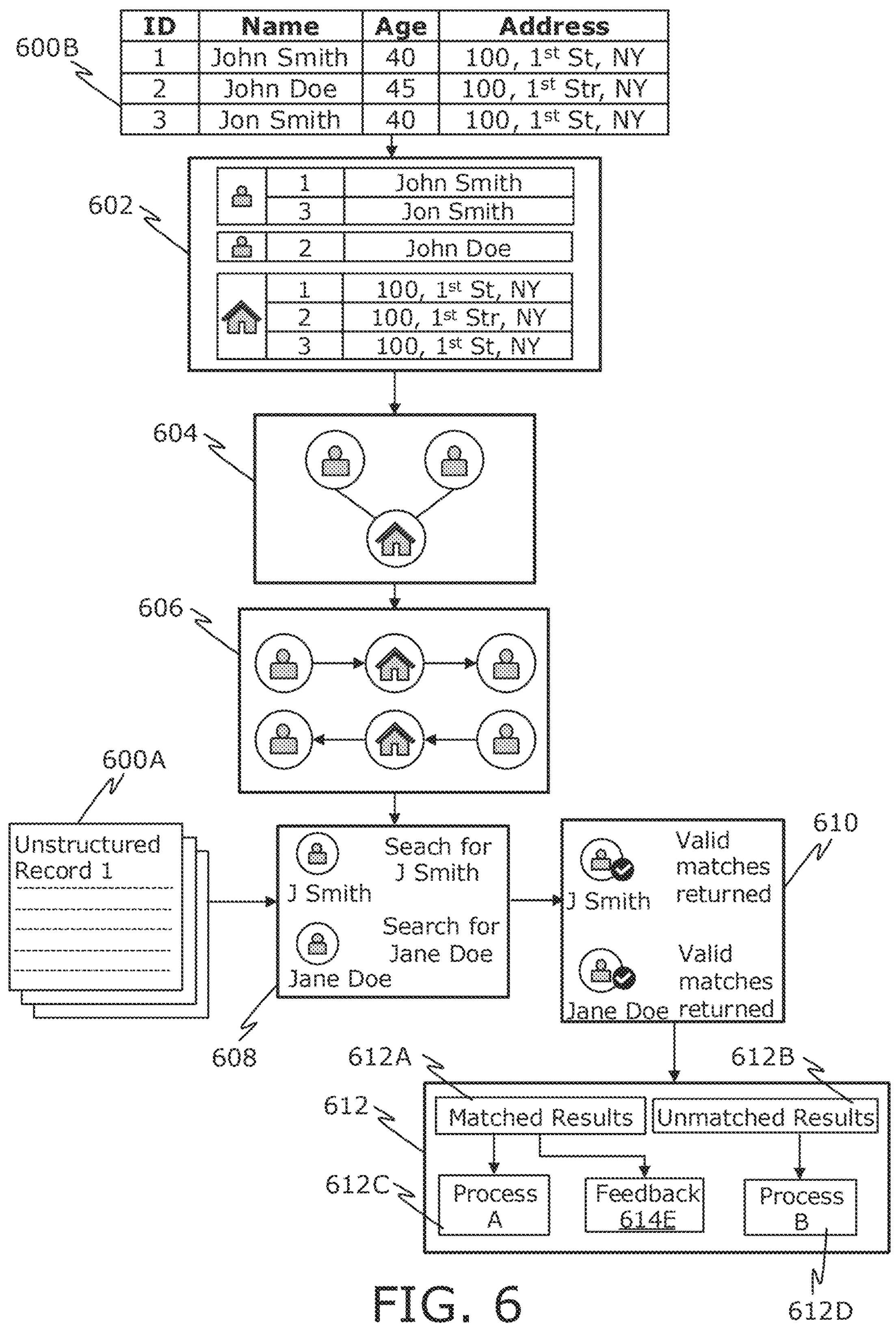
FIG. 6 is a schematic illustration of block diagram representing an example workflow of entity resolution, knowledge graph generation, and match score generation for unstructured data file, in accordance with an embodiment of the present disclosure.

Referring to FIG. 6, illustrated is a schematic block diagram representing an example workflow of entity resolution, knowledge graph generation, and match score generation for unstructured data file 600A, in accordance with an embodiment of the present disclosure. As shown, structured data 600B is received by the semantic data processing system. The structured data 600B shown herein comprises various records with identifiers, names, age, and address in a tabular form. The entity resolution process standardizes and deduplicates entity information, resolving variations such as "John Smith," "Jon Smith," and "John Doe" to canonical forms and addresses to get resolved entities 602. The resolved entities 602 are further used to generate a knowledge graph 604 based on a relationship between the resolved entities 602. Further, the knowledge graph is traversed to generate a traversed knowledge graph 606. Moreover, unstructured data file 600A are feeded into an entity-centric search query generator 608, which executes entity-centric search queries to identify valid matches 610 between the knowledge graph 604 and the unstructured data file 600A. The valid matches 610 are categorized based on a match score. Further, based on the match score a process selection module (not shown in FIG. 6) determines matching result 612. The matching result 612 indicates selection of process for example, process A 612C for a matched result 612A and a process B 612D for an unmatched matched result 612B. Furthermore, a feedback 612E is generated based on the matching result 612 to notify a user (not shown) with the matching result or an status of the matching result.

Figure 7:
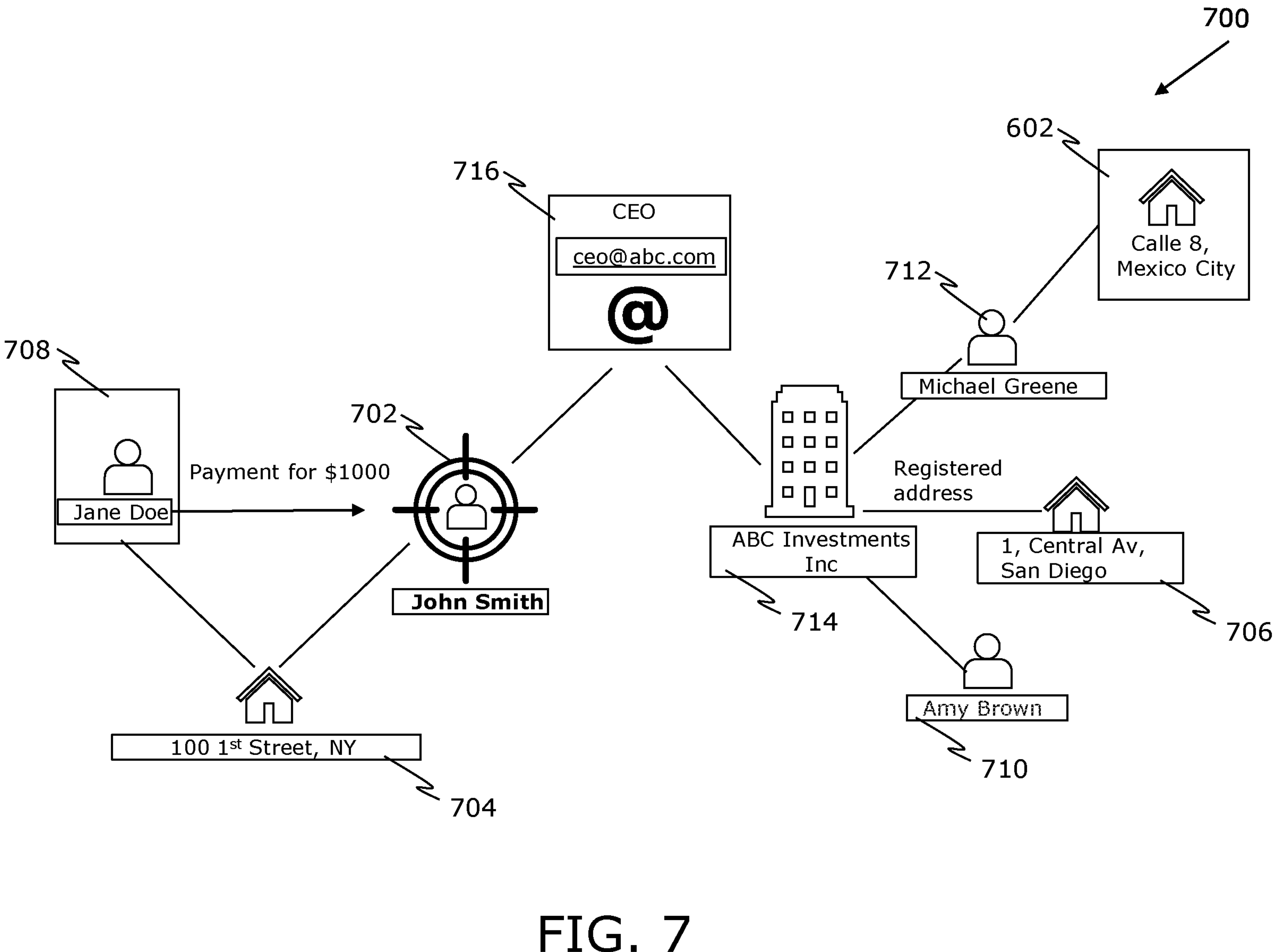
FIG. 7 is a schematic illustration of example of an entity-centric knowledge graph (ECKG) generated for an entity of FIG. 6, in accordance with an embodiment of the present disclosure.

Referring to FIG. 7, illustrated is a schematic example of an entity-centric knowledge graph 700 (ECKG 700) generated for an entity of FIG. 6, in accordance with an embodiment of the present disclosure. As shown, a central entity 702 is "John Smith," who is identified as CEO and is associated with a first registered address 704 at "100 1st Street, NY" and an second address 706 at "1, Central Av, San Diego." The ECKG 700 further includes related entities (such as "Jane Doe 708," "Amy Brown 710," and "Michael Greene 712,") as person which are associated with the central entity 702. The ECKG 700 also include organizational information 714 such as "ABC Investments Inc" and contact information 716 email "ceo@abc.com." The ECKG 700 also shows relationships to a third address 718 such as "Calle 8, Mexico City." Each node and edge in the ECKG 700 represent an entity or an attribute, and the relationships between them, thereby providing a rich semantic context for contextual matching and analysis of unstructured data file.

Figure 8:
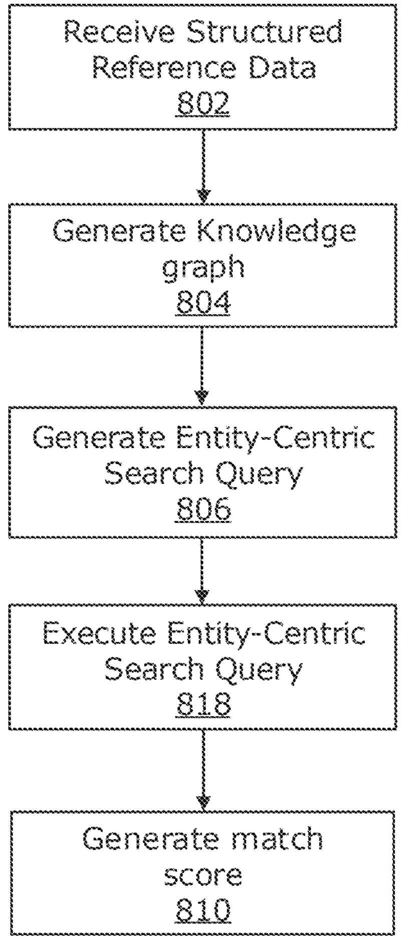
FIG. 8 is an illustration of a flowchart depicting steps of a computer-implemented method for processing a received unstructured data file, in accordance with an embodiment of the present disclosure.

Referring to FIG. 8, illustrated is a flow chart depicting steps of a computer-implemented method for processing a received unstructured data file, in accordance with an embodiment of the present disclosure. At step 802, structured reference data is received. At step 804, a knowledge graph is generated from the structured reference data using knowledge of the structure of the structured reference data, the knowledge graph specifying a plurality of different entities having relationships with each other and relationship data linking the different entities. At step 806, an entity-centric search query is generated by using the knowledge graph, the entity centric search query specifying a plurality of entity-related textual terms and parameters regarding the relationships between the entity-related textual terms. At step 808, the entity-centric search query is executed on the received unstructured data file. At step 810, a match score relating to the relevance of textual content of the unstructured data file to the entity-centric search query is generated.

Provided figures are merely examples, which should not unduly limit the scope of the claims herein. A person skilled in the art will recognize many variations, alternatives, and modifications of embodiments of the present disclosure.

What is claimed is:

1. A semantic data processing system for processing an unstructured data file based on semantics of textual content of the unstructured data file, the system comprising a processing arrangement configured to:

receive, structured reference data, via a reference data ingester;

receive unstructured data files via an unstructured data file preprocessor;

generate, via a knowledge graph generator, a knowledge graph from the structured reference data using the structure of the structured reference data, the knowledge graph specifying a plurality of different entities having relationships with each other and relationship data linking the different entities;

generate, via an entity-centric search query generator, an entity-centric search query by using the knowledge graph, the entity-centric search query specifying a plurality of entity-related textual terms and parameters regarding the relationships between the entity-related textual terms; and execute, via a contextual matching engine, the entity-centric search query on the received unstructured data file to generate a match score relating to the relevance of textual content of the unstructured data file to the entity-centric search query.

2. The semantic data processing system of claim 1, wherein the processing arrangement is further configured to:

determine, via a process selector of an unstructured data file processing engine, a process to be applied to the unstructured data file, using the match score; and process, via a plurality of process execution engines, the unstructured data file, using the determined process.

3. The semantic data processing system of claim 1, wherein the processing arrangement is further configured to employ a pre-processing function associated with the reference data ingester for data cleansing and standardization of the structured reference data.

4. The semantic data processing system of claim 3, wherein the processing arrangement comprises an entity resolution processor configured to identify entities within the structured reference data and perform deduplication of structured reference data relating to the same entity.

5. The semantic data processing system of claim 4, wherein the processing arrangement is further configured to pass back attributes learned from a process of entity resolution to the pre-processing function, by employing the entity resolution processor, to improve data cleansing and standardization of the reference data.

6. The semantic data processing system of claim 4, wherein the entity resolution processor uses at least one of: a machine learning technique, a natural language processing (NLP) technique, a heuristic technique, a classifier technique to perform the entity resolution on the structured reference data.

7. The semantic data processing system of claim 1, wherein the processing arrangement is further configured to generate a strength score relating to a strength of relationship between the entity-centric search query and the textual content of the unstructured data file, and to filter out any textual content having the strength below a defined threshold by employing the knowledge graph generator.

8. The semantic data processing system of claim 1, wherein the processing arrangement is further configured to parse the knowledge graph and generate an entity-centric knowledge graph by employing an entity centric knowledge graph generator, and wherein the entity-centric knowledge graph specifies a specific entity and other related entities having close associations with the specific entity as defined by the relationship data.

9. The semantic data processing system of claim 1, wherein the unstructured data file pre-processor comprises a data indexer, configured to create an unstructured data search index of the textual contents of the unstructured data file.

10. The semantic data processing system of claim 9, wherein the contextual matching engine comprises a search engine configured to execute the entity-centric search query and to output the match score to the unstructured data file processing engine, wherein the search engine comprises a data comparator for comparing the entity-centric search query against the unstructured data search index and a search results scorer to assign the match score to the result of the search.

11. The semantic data processing system of claim 1, wherein the contextual matching engine comprises further filters configured to filter the scored search results to remove the received unstructured data file from further processing, if the results indicate that the unstructured data file is not of further relevance to the knowledge graph.

12. The semantic data processing system of claim 11, wherein the further filters are configurable by a plurality of further filter parameters provided in the semantic data processing system.

13. The semantic data processing system of claim 1, wherein the unstructured data file processing engine comprises a knowledge graph enricher configured to update the knowledge graph with data from the unstructured data file, based on an input from a user.

14. A non-transitory machine-readable storage medium, comprising computer-readable instructions that, when executed by one or more processors, cause the semantic data processing system of claim 1 to carry out a computer-implemented method for processing an unstructured data file based on semantics of textual content of the unstructured data file, the method comprising:

receiving structured reference data, via a reference data ingester;

receiving unstructured data files via an unstructured data file preprocessor;

generating a knowledge graph from the structured reference data using knowledge of the structure of the structured reference data, the knowledge graph specifying a plurality of different entities having relationships with each other and relationship data linking the different entities;

generating an entity-centric search query by using the knowledge graph, the entity centric search query specifying a plurality of entity-related textual terms and parameters regarding the relationships between the entity-related textual terms;

executing the entity-centric search query on the received unstructured data file; and generating a match score relating to the relevance of textual content of the unstructured data file to the entity-centric search query.

15. A computer-implemented method for processing an unstructured data file based on semantics of textual content of the unstructured data file, the method being performed by a semantic data processing system comprising a processing arrangement, the method comprising:

receiving, structured reference data, via a reference data ingester;

receiving unstructured data files via an unstructured data file preprocessor;

generating, via a knowledge graph generator, a knowledge graph from the structured reference data using knowledge of the structure of the structured reference data, the knowledge graph specifying a plurality of different entities having relationships with each other and relationship data linking the different entities;

generating, via an entity-centric search query generator, an entity-centric search query by using the knowledge graph, the entity centric search query specifying a plurality of entity-related textual terms and parameters regarding the relationships between the entity-related textual terms;

executing, via a contextual matching engine, the entity-centric search query on the received unstructured data file; and generating, via the contextual matching engine, a match score relating to the relevance of textual content of the unstructured data file to the entity-centric search query.

16. The computer-implemented method of claim 15, wherein the method further comprises:

determining, via a process selector of an unstructured data file processing engine, a process to be applied to the unstructured data file, using the match score; and processing, via a plurality of process execution engines, the unstructured data file, using the determined process.

17. The computer-implemented method of claim 15, wherein the receiving step comprises a pre-processing step, the pre-processing step comprising data cleansing and standardization of the structured reference data.

18. The computer-implemented method of claim 15, further comprising an entity resolution step, the entity resolution step comprising an entity resolution processor for identifying entities within the structured reference data and performing deduplication of reference data relating to the same entity.

19. The computer-implemented method of claim 18, wherein the entity resolution step uses at least one of: a machine learning technique, a natural language processing (NLP) technique, a heuristic technique, a classifier technique to perform the entity resolution on the structured reference data.

20. The computer-implemented method of claim 15, wherein the step of generating the knowledge graph comprises generating a strength score relating to a strength of a relationship between the entity-centric search query and the textual content of the unstructured data file, and filtering out any textual content having the strength below a defined threshold by employing the knowledge graph generator.

21. The computer-implemented method of claim 15, further comprising an entity-centric knowledge graph generating step which comprises parsing the knowledge graph and generating an entity-centric knowledge graph by employing an entity centric knowledge graph generator, wherein the entity-centric knowledge graph specifies a specific entity and other related entities having close associations with the specific entity as defined by the relationship data.

22. The computer-implemented method of claim 15, further comprising creating, by a data indexer of the unstructured data file preprocessor, an unstructured data search index of the textual contents of the unstructured data file.

23. The computer-implemented method of claim 22, wherein the step of executing the entity-centric search query is performed by a search engine of the contextual matching engine, wherein the search engine outputs the match score to the unstructured data file processing engine, and wherein the search engine comprises:

a data comparator for comparing the entity-centric search query against the unstructured data search index; and a search results scorer for assigning the match score to the result of the search.

24. The computer-implemented method of claim 15, further comprising updating, by a knowledge graph enricher of the unstructured data file processing engine, the knowledge graph with data from the unstructured data file, based on an input from a user.

* * * * *